United States Patent [19]
Wilcox et al.

[11] Patent Number: 6,112,843
[45] Date of Patent: Sep. 5, 2000

[54] HIGH MOBILITY VEHICLE

[75] Inventors: Brian H. Wilcox, La Canada; Annette K. Nasif, Glendale, both of Calif.

[73] Assignee: California Institute of Technology, Pasadena, Calif.

[21] Appl. No.: 08/966,104

[22] Filed: Nov. 7, 1997

Related U.S. Application Data

[60] Provisional application No. 60/030,245, Nov. 7, 1996.

[51] Int. Cl.⁷ .................................................. B60K 17/00
[52] U.S. Cl. ......................... 180/345; 180/8.2; 180/8.3; 180/209; 180/251
[58] Field of Search ..................................... 180/345, 343, 180/337, 347, 209, 8.3, 8.2, 251

[56] References Cited

U.S. PATENT DOCUMENTS 2,751,027  6/1956  McLaughlin .

FOREIGN PATENT DOCUMENTS 206930  12/1986  European Pat. Off. ................. 180/8.2
194171  12/1986  Japan ....................................... 180/8.2

*Primary Examiner*—Eric Culbreth
*Attorney, Agent, or Firm*—Fish & Richardson P.C.

[57] ABSTRACT

A vehicle, for driving over a ground surface, has a body with a left side, a right side, a front and a back. The vehicle includes left and right drive mechanisms. Each mechanism includes first and second traction elements for engaging the ground surface and transmitting a driving force between the vehicle and ground surface. Each mechanism includes first and second arms coupled to the first and second traction elements for relative rotation about first and second axis respectively. Each mechanism includes a rotor having a third axis, the rotor coupled to the body for rotation about the third axis and coupled to the first and second arms for relative rotation about the third axis. The mechanism includes first and second drive motors for driving the first and second traction elements and first and second transmissions, driven by the first and second motors and engaging is the rotor. Driving the first and second traction elements simultaneously rotates the rotor relative to the first and second arms, respectively.

15 Claims, 8 Drawing Sheets

HIGH MOBILITY VEHICLE

CROSS REFERENCE TO RELATED APPLICATIONS

This application claims the benefit of U.S. Provisional Patent Application Serial No. 60/030,245, filed Nov. 7, 1996, the disclosure of which is incorporated herein by reference.

STATEMENT AS TO FEDERALLY SPONSORED RESEARCH

The invention described herein was made in the performance of work under a NASA contract, and is subject to the provisions of Public Law 96-517 (35 USC 202) in which the Contractor has elected to retain title.

BACKGROUND OF THE INVENTION

A variety of high mobility/all-terrain vehicles have been made or proposed. These include a wide variety of tracked and wheeled vehicles.

A number of vehicles have been proposed for extraterrestrial use. Two which have been put into actual use are the four-wheeled lunar rover of the Apollo program and the six-wheeled robotic vehicle, Sojourner, of the Mars Pathfinder program. The suspensions of such vehicles are unidirectional; that is to say they function only when the vehicle is in a generally vertical orientation.

A variety of suspension systems may be used to maintain engagement of the vehicle's wheels with the ground surface. To ensure wheel engagement with particularly uneven surfaces, it is desirable that the suspension be mechanically actuated, either passively or actively, such as by hydraulics, pneumatics, motors or other actuators. In the case of a vehicle with more than three wheels, any three wheels will typically form a tripod upon which the vehicle may rest. To ensure engagement of the remaining wheels, it is necessary that the suspension have at least N−3 actuated degrees of freedom, where N is the number of wheels of the vehicle. If control over the ride height, and/or orientation are required then a system with N actuated degrees of freedom is necessary. The particular character of the actuated degrees of freedom will depend upon the chosen suspension design.

For example, the simplest of all designs would have one actuator vertically reciprocating each wheel. In the case of the Sojourner robot, each rear wheel is mounted on an arm which is pivotally actuated about a transverse axis of the robot. Each pair of front and middle wheels is carried by an arm extending between the axes of the wheels (a "rocker bogie"). The rocker bogie is pivotally moved on another arm which is pivotally actuated about the transverse axis of the robot. This provides the necessary three pivotal degrees of freedom on each side of the vehicle.

For maximizing traction, it is desirable that all wheels be driven. If individual motors are associated with each of the N wheels and individual actuators are associated with each of the N suspension degrees of freedom, then a total of 2N devices (actuators and motors) are required.

SUMMARY OF THE INVENTION

The present invention describes a vehicle where the drive motors may also be used to articulate the vehicle's suspension.

One preferred application for such a vehicle is as a rover used to explore extraterrestrial bodies, especially bodies such as asteroids where gravitational fields are much lower than on earth. In such low gravity environments, the static and dynamic forces due to gravity and vehicular momentum will be smaller than on earth and will thus interfere less with articulation of the suspension. The abilities of the vehicle to traverse rough terrain and orient and position the vehicle body for purposes of sample collecting, instrument positioning, etc. are especially advantageous in such raw environments.

In the case of many higher speed terrestrial vehicles, it is a goal to minimize the unsprung weight; e.g. that which is not carried by the suspension. This tends to increase the sprung weight; e.g. that which is carried by the suspension. The same does not necessarily apply to a vehicle for operation in low gravity environments. The cost of transporting the vehicle to the target environment places enormous penalties on total weight. Thus, by shifting weight from sprung weight to unsprung weight, the size and strength of suspension components may be reduced along with their associated weight. Furthermore, while operating at relatively low speeds, the extra weight of unsprung components may not have a significant effect on vehicle performance. By no To means finally, the reduction of the sprung mass will generally have a tendency to lower the vehicle's center of gravity, and thereby increase its stability. It is therefore advantageous that the relatively heavy drive motors be included in the unsprung mass of the vehicle. This may be achieved by providing gear motors located partially or entirely within each wheel for driving the wheel. By utilizing the same motors to actuate the degrees of freedom of the suspension, significant weight savings may be achieved by avoiding separate actuators for the suspension.

Thus, in one aspect, the invention is directed to a vehicle having a body with a left side, a right side, a front, and a back and having left and right drive mechanisms. Each drive mechanism includes first and second traction elements for engaging the ground surface and transmitting a driving force between the vehicle and the ground surface. Each drive mechanism further includes first and second arms, respectively coupled to the first and second traction elements for relative rotation about first and second axes. Each mechanism further includes a rotor having a third axis. Each mechanism further includes first and second drive motors for driving the first and second traction elements, respectively. Each mechanism further includes first and second transmissions which are driven by the first and second motors, respectively, and engaged to the rotor so that respective driving of the first and second traction elements simultaneously rotates the rotor relative to the first and second arms.

The third axis of the left drive mechanism and the third axis of the right drive mechanism may be coincident and fixed relative to the body. Each drive mechanism may include a plurality of friction disks, normally irrotatably coupled to each other and carried along the third axis. The friction disks may hinder rotation of the rotor, first arm and second arm. Each drive mechanism may include a splined shaft extending along the third axis and carrying the friction disks, the rotor and the first and second arms. Each drive mechanism may further include a spring maintaining compressive engagement between the disk, rotor and first and second arms.

Each traction element may be formed as a wheel. Each rotor may be formed as a pulley and each transmission may include a belt coupling the associated motor to the pulley.

Each rotor may alternatively comprise an externally-toothed gear. Each transmission may comprise a gear train coupling the associated motor to the externally-toothed gear.

DESCRIPTION OF THE PREFERRED EMBODIMENTS

Figure 1:
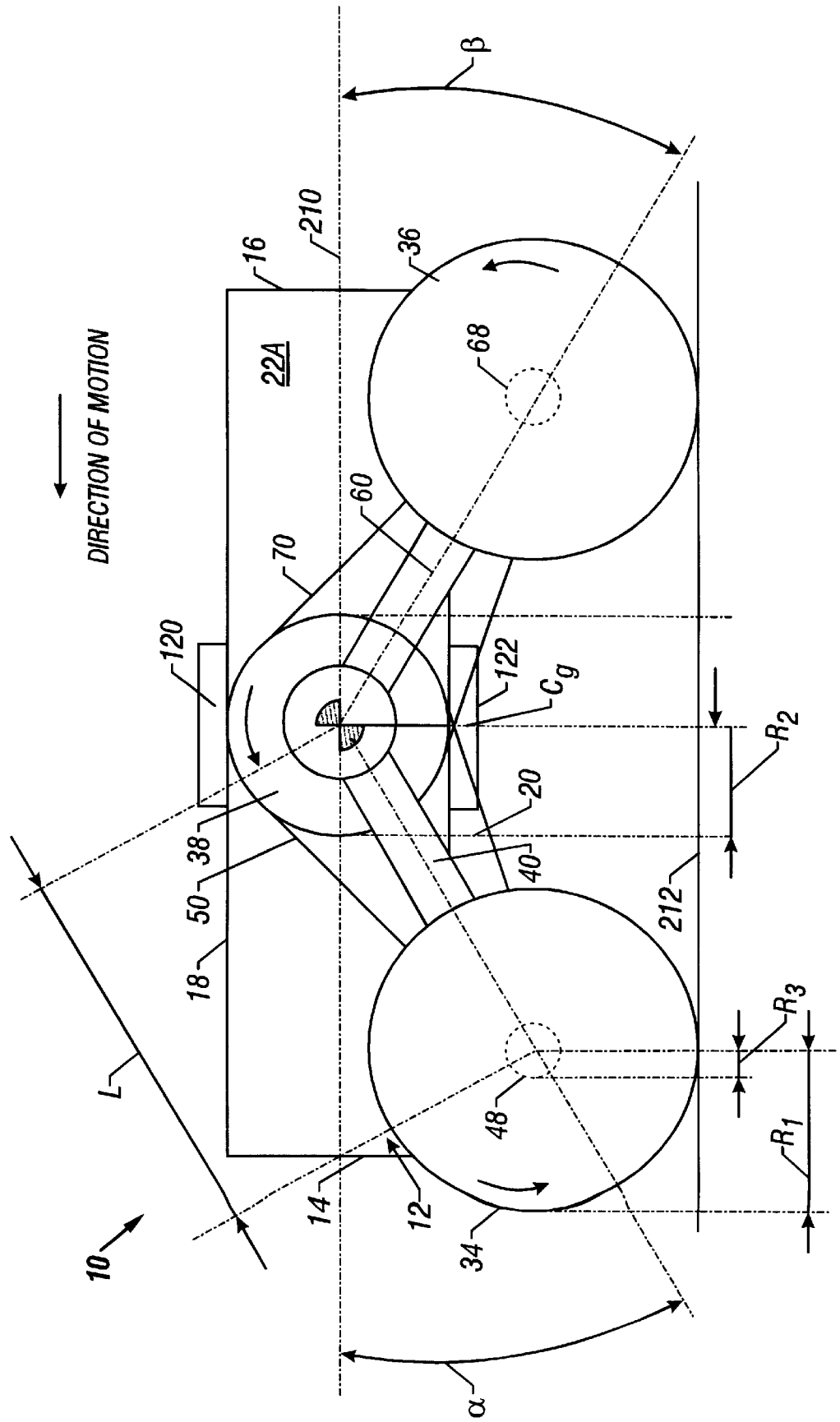
FIG. 1 is a schematic side view of a vehicle.
Figure 2:
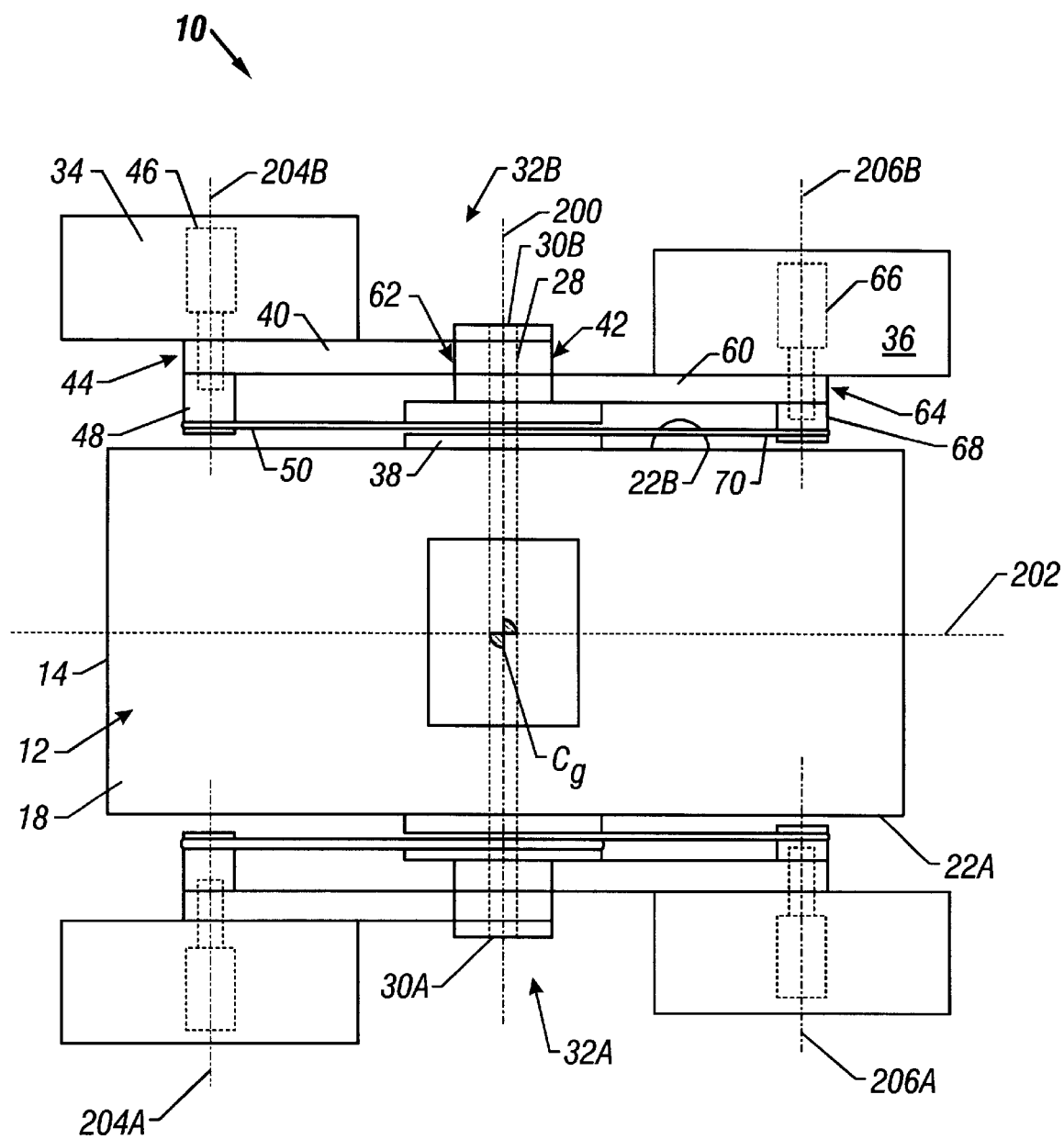
FIG. 2 is a top view of the vehicle of FIG. 1

FIGS. 1 and 2 show a vehicle 10 having a body 12. The body has a front 14, a rear 16, a top 18, a bottom 20, and left and right sides 22A and 22B, respectively. The body has a center of gravity $C_g$ through which a transverse axis 200 and longitudinal vertical center plane 202 (FIG. 2) extend.

Shown in FIG. 2, a transverse shaft 28 is fixed to the body 12. The shaft 28 extends coaxially with the axis 200. The shaft 28 has a left end 30A and a right end 30B. At the respective left and right ends 30A and 30B of the shaft 28 are left and right drive mechanisms 32A and 32B.

Each drive mechanism 32A, 32B includes a first wheel 34 having a central transverse axis 204A, 204B and a second wheel 36 having a central transverse axis 206A, 206B. The first and second wheels 34 and 36 each have a radius $R_1$. A central pulley 38 is carried by the shaft 28 for rotation about the axis 200 which forms a central longitudinal axis of the pulley. The pulley 38 has a radius $R_2$.

Each drive mechanism 32A, 32B has a first arm 40 which couples the first wheel 34 to the body 12. The first arm 40 has a proximal end 42 which is rotatably carried by the shaft 28 and a distal end 44 at which the first arm is rotatably coupled to the first wheel 34 for relative rotation about the axis 204A, 204B. The first arm 40 has an effective lever length L measured between the axis 200 and the axis 204A, 204B. A first drive motor 46 rotates the first wheel 34 relative to the first arm 40 about the axis 204A, 204B. A first pulley 48 is rigidly coupled to the first wheel 34, centered about the axis 204A, 204B. The pulley 48, having a radius $R_3$, is coupled by a belt 50 to the pulley 38. Thus, when the motor 46 rotates the first wheel 34 relative to the arm 40 it also rotates the pulley 38 relative to the arm 40.

Similarly, a second arm 60 couples the second wheel 36 to the body 12. The second arm 60 has a proximal end 62 which is rotatably carried by the shaft 28 and a distal end 64 at which the second arm is rotatably coupled to the second wheel 36 for relative rotation about the axis 206A, 206B. The second arm 60 also has an effective lever arm length L measured between the axis 200 and the axis 206A, 206B. A second drive motor 66 rotates the second wheel 36 relative to the second arm 60 about the axis 206A, 206B. A second pulley 68 is rigidly coupled to the second wheel 36. The second pulley 68 is centered about the axis 206A, 206B. The second pulley 68, also having a radius $R_3$, is coupled by a belt 70 to the pulley 38. Thus, when the motor 66 rotates the second wheel 36 relative to the arm 60 it also rotates the pulley 38 relative to the arm 60.

Figure 3:
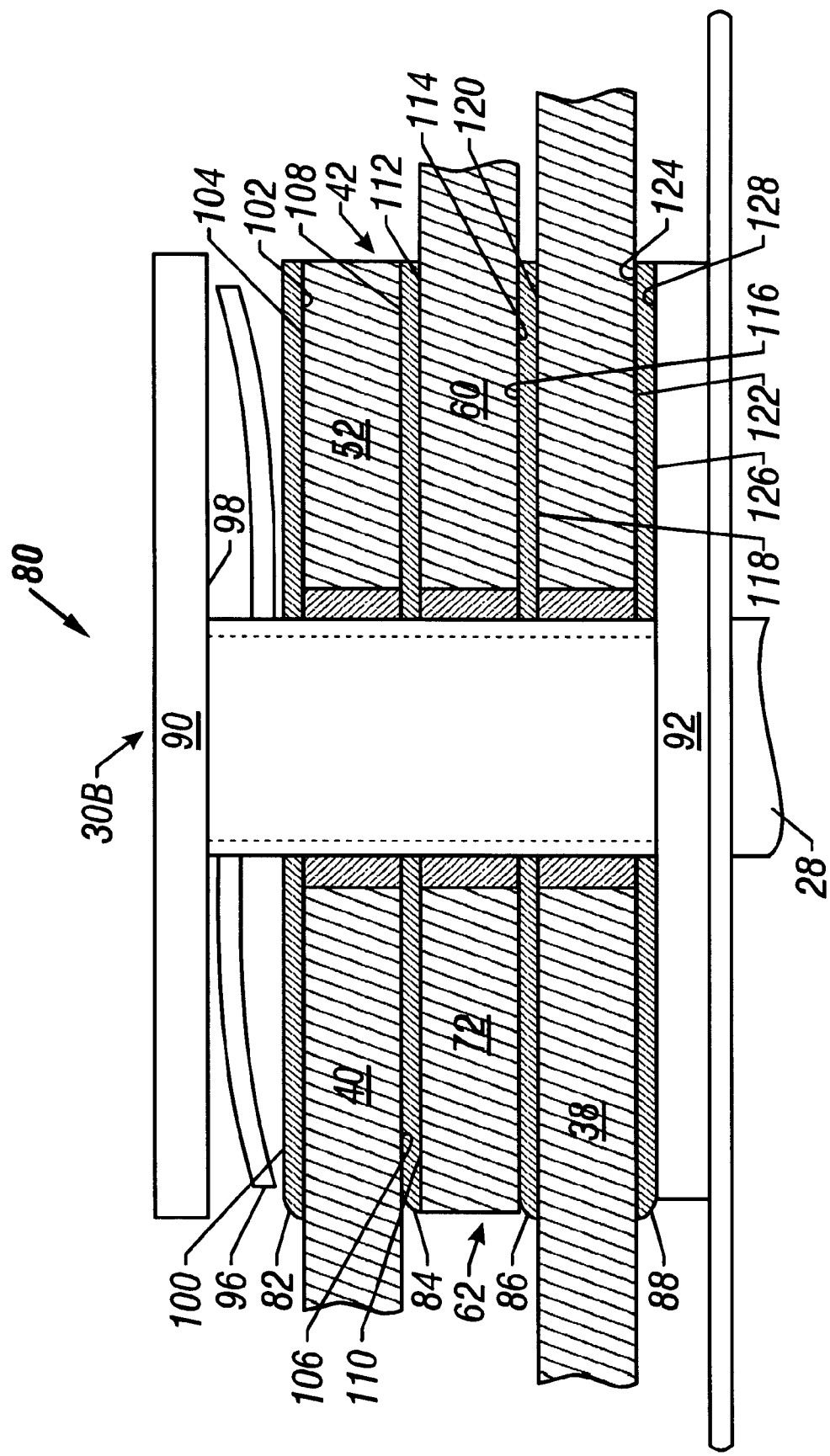
FIG. 3 is an top cross-sectional view of a clutch mechanism of the vehicle of FIG. 1.

Each drive mechanism 32A, 322 includes a clutch mechanism 80 (FIG. 3) including first, second, third and fourth friction disks 82, 84, 86, 88, respectively, splined to the shaft 28 adjacent the associated shaft end 30A, 30B. The friction disks thus can not rotate relative to the shaft. The friction disks are secured between an outer collar 90 and an inner collar 92, which collars are axially secured to the shaft. At respective proximal ends 42 and 62 of first and second arms 40 and 60 there are formed disk-shaped protuberances 52 and 72. The protuberances 52 and 72 interact with the pulley 38 and friction disks 82, 84, 86 and 88 to resist movement of the arms 40 and 60 and the pulley 38 relative to the shaft 28. The protuberances 52 and 72 and the pulley 38 are each centrally apertured for carrying a bearing to minimize direct friction with the shaft 28.

A spring 96 is compressed between an inner face 98 of the collar 90 and an outer face 100 of the disk 82, to press the disk 82 inward and compressively sandwich the disks, protuberances and central pulley. The spring 96 is configured to apply approximately uniform pressure to the disk 82. The inner face 102 of disk 82 bears against the outer face 104 of the protuberance 52. The inner face 106 of the protuberance 52 bears against the outer face 108 of disk 84. The inner face 110 of the disk 84 bears against the outer face 112 of the protuberance 72. The inner face 114 of the protuberance 72 bears against the outer face 116 of the disk 86. The inner face 118 of disk 86 bears against the outer face 120 of the central pulley 38. The inner face 122 of the central pulley 38 bears against the outer face 124 of disk 88. The inner face 126 of disk 88 bears against the outer face 128 of the collar 92. The bearing of adjacent disks against the faces of the protuberances and central pulley produces friction between the disks and adjacent protuberances and central pulley. This produces resistance to rotation of the protuberances and pulley relative to the shaft because the disks are splined to the shaft.

For purposes of exposition, the static and dynamic friction properties of the disks, protuberances and central pulley are assumed to be equivalent. The protuberances are formed of the same material as the central pulley and have identical contact areas with adjacent disks. Thus, for given frictional properties, dimensions, and normal force from the spring 96, a certain torque, relative to the body, must be applied to the central pulley or to one of the individual protuberances to induce rotation of that central pulley or protuberance relative to the body. This torque, designated T, is evenly split between breaking friction between the element and each of the two friction disks on either side of the element.

In an initial driving condition shown in FIG. 1, the respective first and second arms 40 and 60 are at angles α and β from the transverse longitudinal center plane 210 of the body 12. With the vehicle on a flat horizontal ground surface 212, and the plane 210 extending parallel to the ground surface, the angles α and β are equal, leaving an angle γ (not shown) between the arms of 180°-α-β. In this configuration, to drive the vehicle forward, the first and second drive motors 46 and 66 are powered. The motors may be controlled by software running on a central computer (not shown) which may receive inputs from a variety of torque, speed, or other sensors (also not shown). The belts 50 and 70 rigidly link rotation of the associated wheels to rotation of the central pulley 38. Therefore, in order for the vehicle to move, the combined effect of the motors must be sufficient to produce a torque at least equal to the threshold torque T on the central pulley 38. The action of each motor produces a torque on its associated protuberance which is equal in magnitude and opposite in direction to the torque applied by that motor to the central pulley 38. If each motor applies a torque to the pulley 38 which is slightly greater than T/2, the pulley will begin to rotate about the axis 200 as the total torque on the pulley exceeds T. Since the responsive torque on each protuberance is only slightly greater than T/2, this torque is insufficient to break friction between the protuberance and the adjacent friction disks. Thus, the arms 40 and 60 remain fixed relative to each other and relative to the body 12. The wheels 34 and 36 then rotate with the central pulley 38 and the vehicle proceeds forward. If opposite torque were applied by the motors, the vehicle would proceed rearward. To increase the acceleration of the vehicle, the torque applied by the motors 46 and 66 may be increased just up to the threshold where they each apply a torque T to the central pulley 38 and thus to their associated protuberance. Any further increase in torque will break friction between the protuberances and their adjacent disks causing the suspension geometry to alter. The vehicle may be skid-steered by running the motors on the left and right sides at different speeds or directions.

The angles α and β between the arms 40 and 60 and the plane 210 may be controlled by action of the motors 46 and 66. If it desired to alter the angle α of an initially stationary vehicle, the first motor 46 may be powered while the second motor 66 remains unpowered. With the second motor unpowered, the torque required to be applied by the first motor to cause rotation of the central pulley 38 is not simply the torque T required to break friction between the pulley and its adjacent friction disks. Rather, since the second belt 70 links rotation of the pulley to rotation of the second arm 60 so as to lock the pulley and second arm 60 to each other, in order to rotate the pulley, the friction between the second protuberance 72 and its adjacent friction disks must also be broken. The required torque is thus 2T. The first motor, however, is incapable of exerting such torque on the pulley 38. When the torque exerted by the first motor on the pulley 38 exceeds T, the friction torque threshold is exceeded and friction between the first protuberance 52 and the adjacent friction disks will be broken. This causes the arm 40 to rotate relative to the body 12, thus altering the angle α.

Figure 4:
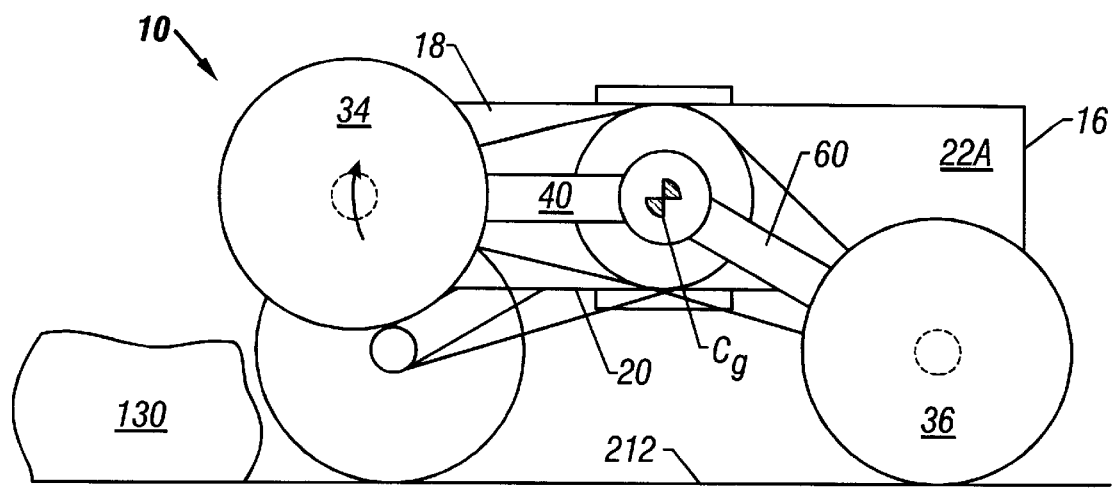
FIGS. 4–10 are schematic side views of the vehicle of FIG. 1 with suspensions in various articulations.

By reducing the angle α, the front of the vehicle, at the wheel 34, may be lowered relative to the ground or the wheel 34 raised, such as to ascend an obstacle. As shown in FIG. 4, to raise the wheel 34 the motor 46 applies a torque in a direction which would otherwise cause the wheel 34 to rotate clockwise relative to the arm 40. This is the direction associated with forward movement of the vehicle when both motors on each side are engaged. Since however the pulley 38 is held fixed, the effect is that the arm 40 is caused to rotate clockwise thus raising the wheel. Similarly, by increasing a the vehicle may be raised or wheel lowered, such as to track a depression in the ground by reversing the direction of torque applied by the motor.

A wheel may be raised while driving up a side of an obstacle. Alternately, however, as shown in FIG. 4, the wheel may be raised off the ground surface prior to contacting the obstacle 130. The vehicle may then be driven forward on the remaining wheels so that the raised wheel is above the obstacle. The raised wheel may then be lowered and placed atop the obstacle. Such a mode may be useful when the shape or properties of the obstacle prohibit a traction ascent. In such a mode, the three remaining wheels may need to be raised or lowered to stabilize the center of gravity within the tripod formed by the remaining wheels. This may be done by raising the diagonally opposite wheel, lowering the longitudinally opposite wheel, raising the transversely opposite wheel, or various combinations of such movements.

Figure 5:
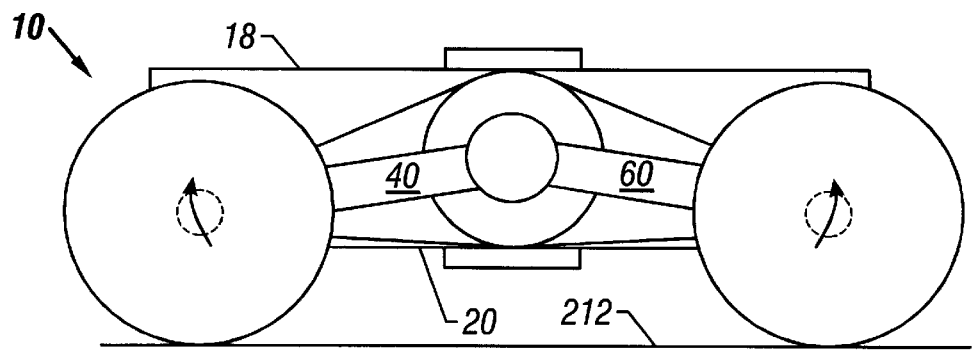
Figure 6:
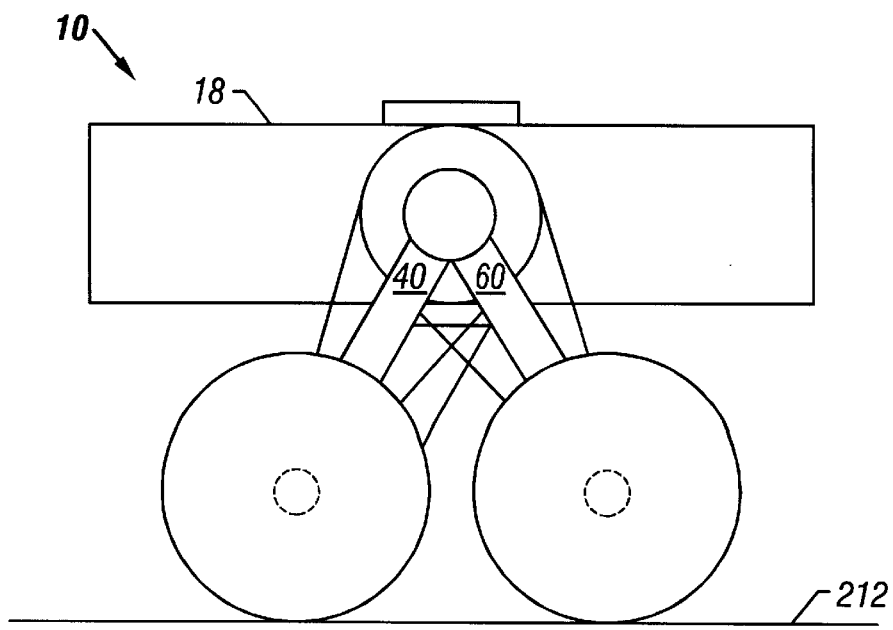
Figure 8:
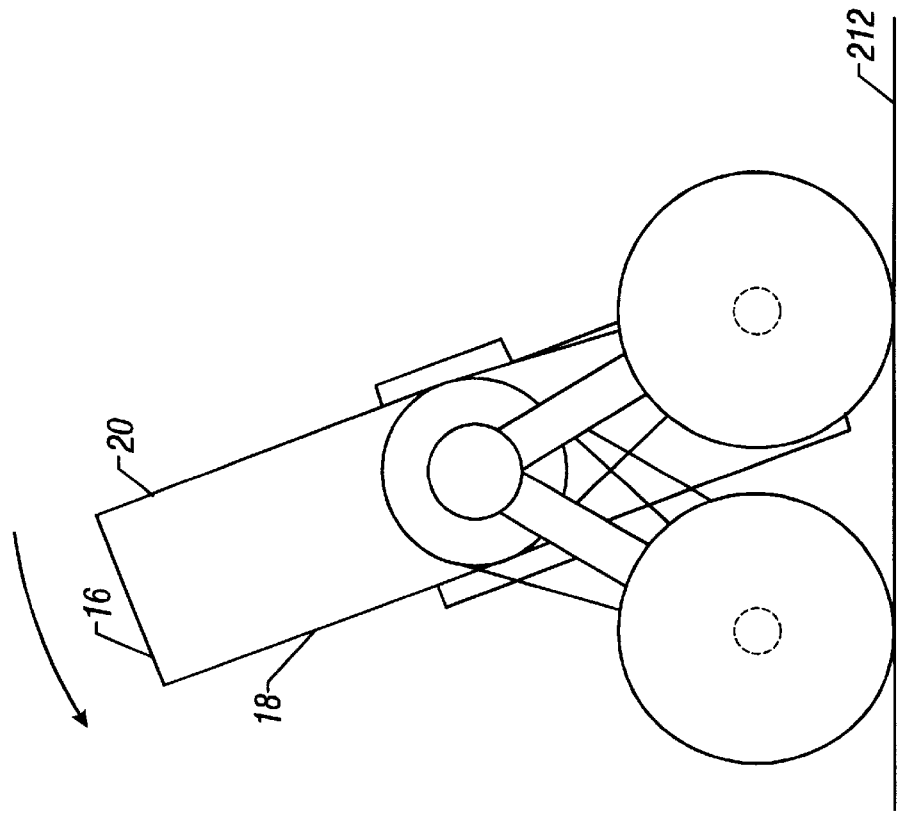
Figure 7:
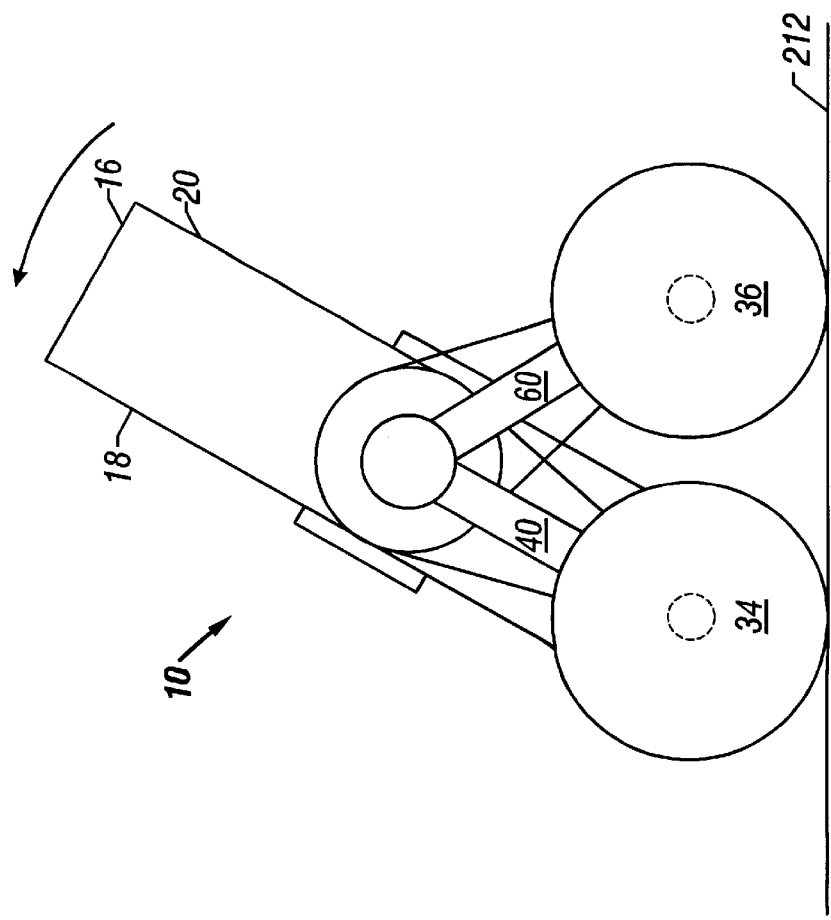

If it is desired to raise or lower the entire vehicle relative to the ground, the first and second wheels on each side may be raised or lowered sequentially. Alternatively, they may be raised or lowered together. To accomplish this, the motors 46 and 66 are powered to rotate to operate in opposite directions. Each motor 46 and 66 imparts an equal and opposite torque on the central pulley 38. These torques approximately cancel (i.e.; algebraically add to less than T) so the pulley will remain stationary. However, when the magnitude of the torque applied by each motor 46 and 66 exceeds T the counter torque is sufficient to break the friction between the protuberances 52 and 72 and their adjacent disks to simultaneously either increase or decrease the angles α and β. Thus, the entire side of the vehicle may be lowered or raised relative to the ground surface. If the mechanisms on both sides are similarly actuated, the entire vehicle may be lowered (FIG. 5) or raised (FIG. 6). Thus, the vehicle may be lowered to place its bottom 20 or a portion thereof or fixture thereon in contact with the ground. This may be useful for taking soil samples or performing other operations. The body 12 may then be raised to resume movement. For purposes of exposition, the modes wherein the angles α and β are simultaneously respectively increased and decreased are referred to "contraction" and "extension" modes.

By differentially raising or lowering the sides of the vehicle, the vehicle may be made to rotate about a longitudinal axis ("roll") in one direction or another relative to the ground surface. Similarly, by differentially raising or lowering the ends of the vehicle, rotation about a transverse axis ("pitch") may be controlled. Control over pitch and roll may be used to maintain a given attitude of the vehicle while traversing nonlevel terrain or may be used to orient the vehicle in a particular orientation, for example so as to provide a particular view for an instrument on the vehicle.

If the vehicle were to become inverted, it may nevertheless continue to navigate by articulating the arms 40, 60 in the extension mode so that the angles α and β go through zero and become negative. In such a way, the vehicle may navigate in an inverted orientation. Furthermore, the vehicle can be caused to flip by drawing one corresponding arm of each drive mechanism toward the opposite end of the vehicle until the wheels associated with such arms are below the center of gravity. Thereafter, the vehicle will flip over about those wheels and land in an inverted configuration.

Figure 9:
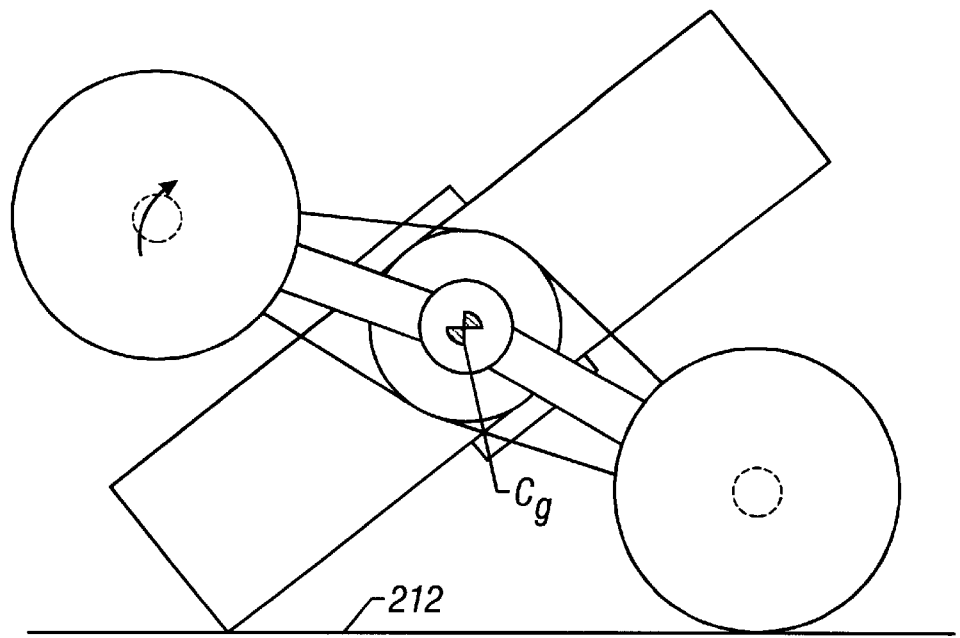
Figure 10:
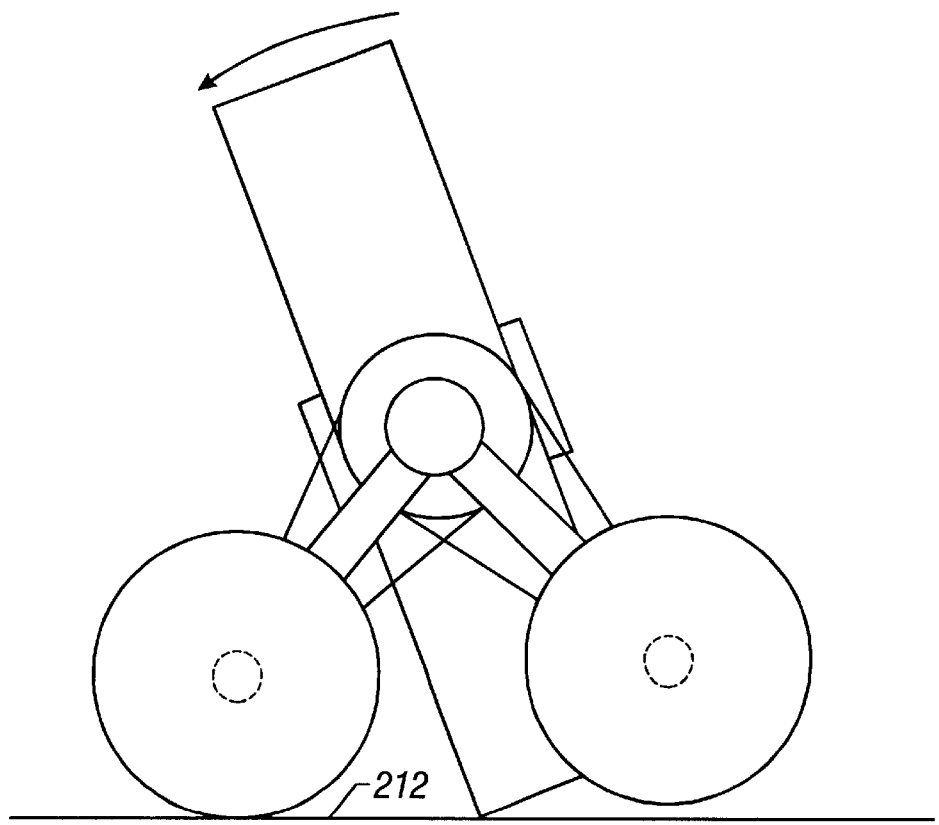

In low gravity environments, the relative significance of inertial forces relative to gravitational forces is increased. Thus, a sudden encounter with an obstacle may very easily cause a vehicle in a low gravity environment to flip over. This is especially true when the vehicle is confronted with uneven or unpredictable terrain. It is therefore highly advantageous that the vehicle be configured for self-righting from an inverted state. Self righting may be achieved in a number of other ways. For example, if the length of the body is sufficiently short, the suspension may be contracted and the body simply pivoted approximately 180° about the shaft axis. With the body in the relatively raised and the suspension in the relatively contracted positions of FIG. 6, the arms 40 and 60 on both sides of the vehicle may be sequentially rotated about the axis 200 by small increments. If, as shown in the drawing, the arms are sequentially rotated clockwise relative to the body, the effect will be that the body will rotate relative to the ground surface 212 so that the rear end 16 raises while the front end 14 lowers. This process may be repeated to permit the vehicle to invert the body relative to the ground surface. Alternately, if the body length is sufficiently small, a first pair of wheels at a first end of the body may be raised so as to lower the end of the body into contact with the ground (FIG. 9), the longitudinally opposite pair of wheels may then be lowered while being driven toward the first end of the body. This will cause the body to flip about the first end whereupon the first pair of wheels are brought back into engagement with the ground (FIG. 10).

Optionally, the body may be provided with a significant degree of top to bottom symmetry. For example, in the case of a solar-powered vehicle both the top and bottom may be provided with solar cells (not shown) to allow the vehicle to function with either the top or bottom facing away from the ground surface. For economy and space efficiency, different instruments may be provided on the top and bottom. For example, the top might bear one or more cameras 120 while corresponding areas of the bottom bear probes 122 for taking samples. The body may be sequentially inverted to permit sequential use of the instruments on the top and bottom.

In low gravity environments, such as when a vehicle is used to explore an asteroid, the contraction mode may be used to induce the vehicle to hop up from the ground surface. For example, on a small asteroid with a surface gravity of 0.0002 m/s$^2$ an induced initial upward velocity of 2 cm/s will cause the vehicle to hop upward about 1 m.

The loss of traction of a single wheel does not inherently cause the loss of motive forces from the motor associated with that wheel. A wheel may lose traction for a variety of reasons. For example: it may be on particularly loose soil; it may have naturally come out of contact with the ground, such as when traversing a crevasse; or it may have been intentionally raised out of engagement with the ground. In such a situation, it may still be possible to utilize the drive motor associated with the disengaged wheel to add power to a wheel that remains engaged. A torque up to the threshold torque T may be applied by the motor of the disengaged wheel parallel to the torque of the motor of the associated engaged wheel. In such a way, it will add to the drive torque and force between the engaged wheel and the ground surface.

A variety of considerations influence the selection of components geometries and properties. A preferred property of all-terrain vehicles is that there is enough available drive torque at each wheel so that the rim thrust is approximately equal to the vehicle's weight. The rim thrust is the net drive torque applied to the wheel divided by the wheel radius. The drive torque is net of any torque which must be transmitted to the central pulley or rotor to cause its rotation. It is further desirable that enough net actuation torque is capable of being applied to a given arm to lift the vehicle's weight. This net actuation torque is thus the vehicle's weight multiplied by the arm's length. Combining these considerations, a preferred proportion involves having an equal ratio of central pulley radius $R_2$ to wheel pulley radius $R_3$ and arm length L to wheel radius $R_1$. Although preferred, the radii of the front and rear wheels need not be the same. If different, it is preferred that the ratios be preserved. Thus, if the rear wheel has a radius $R_1$ and has a wheel pulley of radius $R_3$ and an arm of length L while the dimensions of the front wheel and its associated wheel pulley and arm are $R_1'$, $R_3'$ and L', respectively it is preferred that $R_1$ dived by the product of $R_3$ and L be equal to $R_1'$ divided by the product of $R_3'$ and L'. This is for the case where both front and rear wheels are acting upon a pulley of the same radius.

The need to actuate the arms into asymmetric angles in the presence of gravitational forces places a lower bound on the threshold torque T and thus on the friction imposed by the clutch mechanisms. However, the higher the friction, the more torque which is required of the motors both to actuate the suspension and simply to drive the vehicle. Thus, concerns for light weight and efficiency will indicate the desirability of a relatively low threshold torque.

Figure 11:
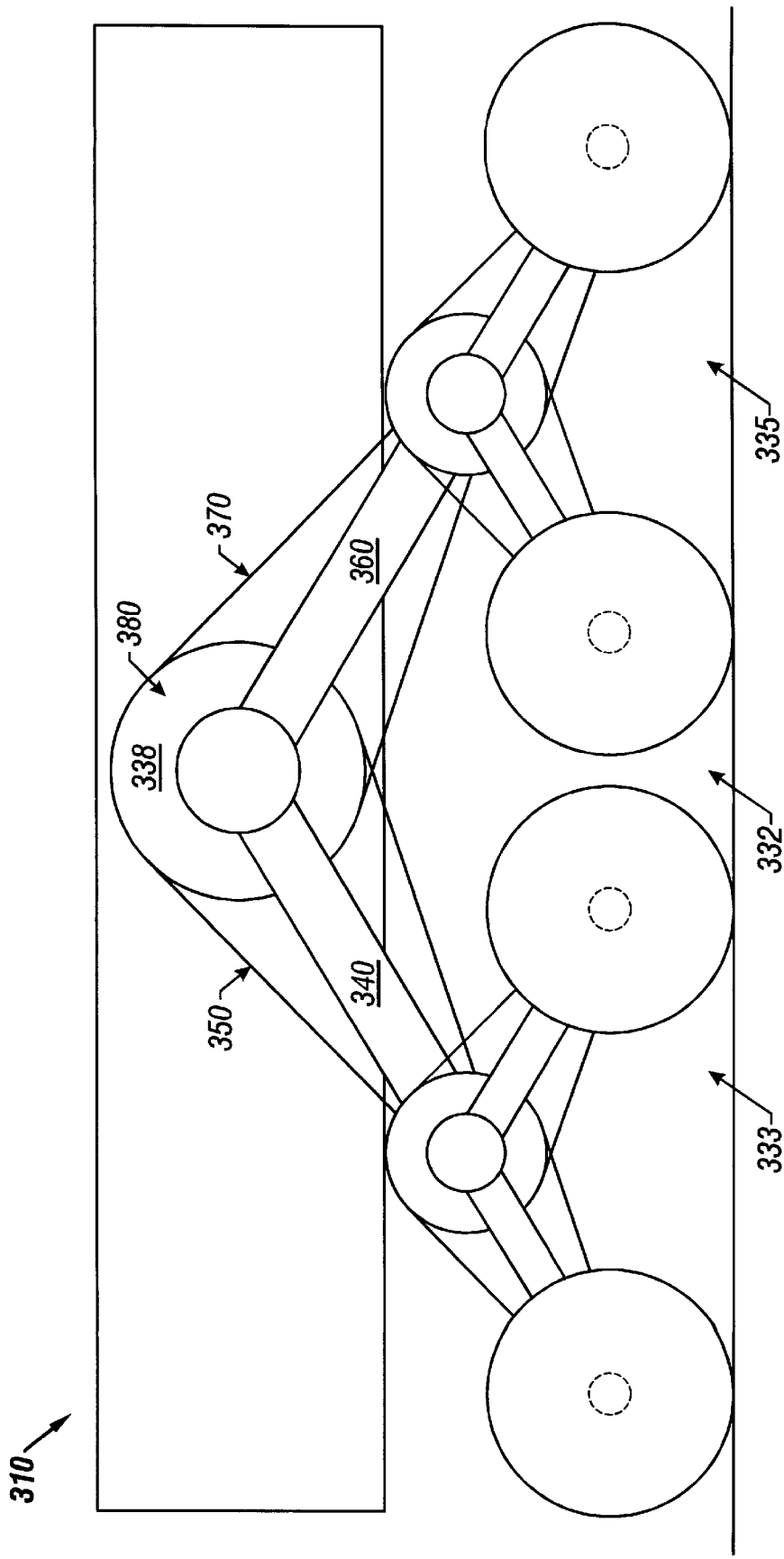
FIG. 11 is a schematic side view of a second vehicle.

FIG. 11 shows a vehicle 310 having four wheels per side. The drive mechanism 332 includes front and back sub-mechanisms 333 and 335 at each side, which may be otherwise similar to the drive mechanisms 32 of vehicle of FIG. 1. The central pulleys of the sub-mechanisms 333 and 335 are coupled to a central pulley 338 of the mechanism 332 via arms and belts in similar fashion to the coupling of the wheels 34 and 36 to the central pulley 38a, 38b of the drive mechanism 32 of the vehicle of FIG. 1. A clutch mechanism 380 may couple the central pulley 338 and arms 340 and 360, as previously described relative to drive mechanism 32. The mechanism 332 need not have the illustrated symmetry; for example, the arm 340 could couple the pulley 338 directly to a wheel instead of to a sub-mechanism. In such a way, a vehicle with three wheels on each side would be obtained. Other, more complex mechanism, are also possible.

Figure 12:
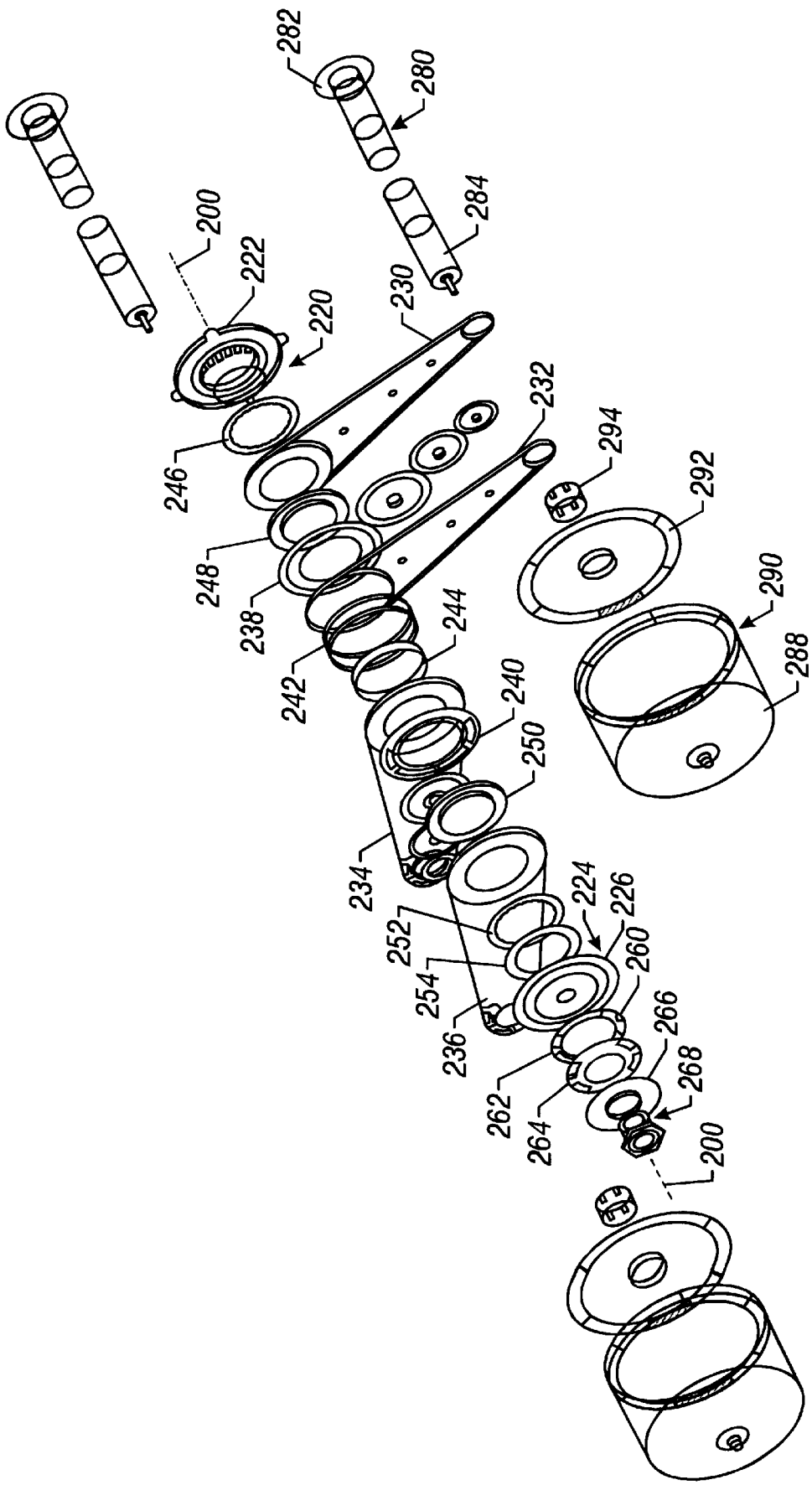
FIG. 12 is an exploded view of a drive mechanism of a vehicle.

FIG. 12 shows an exploded view of an alternate drive mechanism featuring gear trains instead of belts and pulleys. A shaft section is formed along the transverse axis 200 by an inboard internally threaded sleeve 220 mated with an outboard externally threaded sleeve 224. The sleeve 220 has a collar 222 at its inboard end. The collar 222 may include mounting features for securing the sleeve to the vehicle body and the sleeve is splined along an inboard section. The sleeve 224 includes a collar 226 formed at its outboard end. The sleeve 224 is similarly splined adjacent its outboard end so that the assembled shaft section includes inboard and outboard splined sections and a central unsplined section.

An inboard arm is formed with inner and outer shell sections 230 and 232, respectively. Similarly, an outboard arm is formed with inner and outer shell sections 234 and 236, respectively. Each arm contains a proximal to distal extending train of gears. The proximal gears 238 and 240 in the respective trains of the inboard and outboard arms are affixed to each other by the housing 242 of a bearing assembly. The housing 242 spans and extends through openings in the outer shell 232 of the inboard arm and the inner shell 234 of the outboard arm along the axis 200. The ball bearing unit 244 rides along the central unsplined portion of the shaft to allow the assembled gears 238 and 240 to rotate. With the mechanism assembled, a first friction disk 246 is irrotatably carried by the sleeve 220 with an outboard annular surface of the disk 246 engaging an inboard annular surface of the proximal end of the inner shell section 230 of the first arm. A corresponding outboard annular surface of the inner shell section 230 engages the inboard annular surface of a second friction disk 248 which is also irrotatably held by the sleeve 220. This engagement between the inner shell section 230 and the disks 246 and 248 resists rotation of the first arm about the axis 200. The outboard annular surface of the second friction disk 248 engages the inboard annular surface of the gear 238. The outboard annular surface of the gear 240 engages the inboard annular surface of a third friction disk 250 which is irrotatably held by the sleeve 224. This engagement between the disks 248 and 250 and gears 238 and 240 resists rotation of the gears 238 and 240 about the axis 200.

The outboard annular surface of the third friction disk 250 engages an inboard annular surface of the proximal end of the outer shell section 236 of the outboard arm. A corresponding outboard annular surface of the outer shell section 236 engages the inner annular surface of a fourth friction disk 252 which is also irrotatably held by the sleeve 224. This engagement between the outer shell section 236 and the disks 250 and 252 resists rotation of the outboard arm about the axis 200. A backing ring 254 is positioned against the outboard annular surface of the fourth friction disk 252 and located immediately inboard of the collar 226. Outboard of the collar 226 is a pusher ring 260 with a plurality of inwardly-directed pins 262 extending through holes in the collar 226 and engaging the outboard annular surface of the backing ring 254. A spring 264 is held between the pusher ring and a collar 266. A hollow bolt 268 secures the collar 266 to the sleeve 224, holding the spring 264 in compression between the collar 266 and pusher ring 260. Via the pins 262, the compression is transferred to the backing ring 254 and thus to the various friction disks and the elements the friction disks engage. The pusher ring 260 and the backing ring 254 allow the compressive force from the spring 264 to be uniformly transmitted through the stack of friction disks while reducing the possibility of the intrusion of dust or other foreign matter. Also, the housing design minimizes gaps through which foreign matter may enter the assembly.

At the distal end of each arm, a motor carrier 280 is secured by a flange 282 to the inner shell section 230, 234. The motor carrier carries a motor 284 with a shaft 286 secured to the outboard web 288 of a wheel 290 such as by a clamp (not shown). A splined aperture in an inboard web 292 of the wheel 290 irrotatably receives a sleeve 294 which extends through a distal aperture in the outer shell section 232, 236. The inboard end of the sleeve 294 bears external teeth and serves as the distal gear in the gear train.

In operation, torque from the motors 284 is transmitted to the wheels and up through the gear trains to the proximal gears 238 and 240. The attached proximal gears 238 and 240 have a similar rotor function to the pulley 38.

A number of embodiments of the present invention have been described. Nevertheless, it will be understood that various modifications may be made without departing from the spirit and scope of the invention. For example, wheels with grousers or other traction increasing features may be provided and traction elements other than wheels may be used. These may include belts or tracks. In place of the belt and pulley or gear train transmissions, other mechanisms may be used such as chains and sprockets, shafts, etc. More advanced or complex clutch mechanisms may be used in place of the illustrated friction disk and spring arrangement. For example, a latching mechanism or clutch may be provided which is actuated by differential wheel torques or motions analogous to the operation of the previously-described friction clutch mechanism. Such a system may substantially eliminate energy losses through the friction clutch during driving of the vehicle. Computer-controlled latching mechanisms or clutches may be used and may be configured to selectively lock and unlock the arms and rotor from each other. Various modes of operation may be combined simultaneously or seriatim and other modes are possible. By no means finally, the principles of the invention may be extended to vehicles with more than two wheels (or other traction elements) per side, vehicles other than skid-steered vehicles, and vehicles with more complex suspension geometries. Furthermore, a variety of complex feedback control systems may be employed taking inputs from torque and force sensors on the various components so as to determine the interaction between each wheel and the environment and optimally apportion the drive and orientation forces applied by the motors to each wheel. Accordingly, other embodiments are within the scope of the following claims.

What is claimed is:

1. A movable vehicle comprising:
   (a) a body having a left side, a right side, a front and a back; and
   (b) left and right drive mechanisms, coupled to said body, each of said left and right drive mechanisms comprising:
       a first traction element engaging a ground surface and transmitting a driving force between the vehicle and the ground surface;
       a second traction element, engaging the ground surface and transmitting a driving force between the vehicle and the ground surface;
       a first arm, coupled to the first traction element for relative rotation about a first axis;
       a second arm, coupled to the second traction element for relative rotation about a second axis;
       a rotor member having a third axis, said rotor member coupled to the body for rotation about said third axis, and coupled to said first arm and said second arm for relative rotation about the third axis;
       a first drive motor coupled to drive the first traction element;
       a second drive motor coupled to drive the second traction element;
       a first transmission, driven by the first motor and engaging the rotor member so that driving the first traction element simultaneously rotates the rotor member relative to the first arm; and
       a second transmission, driven by the second motor and engaging the rotor member so that driving the second traction element simultaneously rotates the rotor member relative to the second arm.

2. The vehicle of claim 1, wherein the third axis of the left drive mechanism and the third axis of the right drive mechanism are coincident and fixed relative to the body.

3. The vehicle of claim 1, wherein for each of said left and right drive mechanisms the first axis is parallel to and of fixed separation from the third axis and the second axis is parallel to and of fixed separation from the third axis.

4. The vehicle of claim 1, wherein each of the left drive mechanism and the right drive mechanism further comprises a plurality of friction disks normally irrotatably coupled to each other and carried along the third axis, the plurality of friction disks hindering rotation of the rotor member, first arm and second arm.

5. The vehicle of claim 4, wherein each of the left drive mechanism and the right drive mechanism further comprises:
   a splined shaft member, extending along the third axis and carrying the plurality of friction disks, the rotor member, the first arm and the second arm; and
   a spring, maintaining compressive engagement between the plurality of friction disks, the rotor member, the first arm and the second arm.

6. The vehicle of claim 5, wherein each of the left drive mechanism and the right drive mechanism includes first, second, third and fourth friction disks in the plurality of friction disks, the first friction disk located inboard of the rotor member, the second friction disk located between the rotor member and the first arm, the third friction disk located between the first arm and the second arm, and the fourth friction disk located outboard of the second arm.

7. The vehicle of claim 5, wherein each of the left drive mechanism and the right drive mechanism includes first, second, third and fourth friction disks in the plurality of friction disks, the first friction disk located inboard of the first arm, the second friction disk located between the rotor member and the first arm, the third friction disk located between the rotor member and the second arm, and the fourth friction disk located outboard of the second arm.

8. The vehicle of claim 1, wherein each of the first and second traction elements of the left and right drive mechanisms comprises a wheel engaging the ground surface and transmitting a driving force between the vehicle and the ground surface.

9. The vehicle of claim 1, wherein:

each said rotor member comprises a pulley;

each said first transmission comprises a belt coupling the associated first motor to the pulley; and each said second transmission comprises a belt coupling the associated second motor to the pulley.

10. The vehicle of claim 1, wherein each said rotor member comprises an externally toothed gear.

11. The vehicle of claim 1, wherein:

each said rotor member comprises an externally toothed gear;

each said first transmission comprises a gear train coupling the associated first motor to the externally toothed gear; and each said second transmission comprises a gear train coupling the associated second motor to the externally toothed gear.

12. A vehicle, for driving over a ground surface, the vehicle comprising:

(a) a body having a left side, a right side, a front and a back;

(b) a left drive mechanism; and (c) a right drive mechanism, wherein each of the left drive mechanism and the right drive mechanism comprises:

a first wheel having a first axis;

a second wheel having a second axis;

a pulley having a third axis and coupled to the body for rotation about the third axis;

a first arm coupling the first wheel to the body, rotatable relative to the first wheel about the first axis, and rotatable relative to the pulley about the third axis;

a second arm coupling the second wheel to the body, rotatable relative to the second wheel about the second axis, and rotatable relative to the pulley about the third axis;

a first drive motor for rotating the first wheel about the first axis relative to the first arm;

a second drive motor for rotating the second wheel about the second axis relative to the second arm;

a first belt driven by the first motor and engaging the pulley; and a second belt driven by the second motor and engaging the pulley.

13. The vehicle of claim 12, wherein each of the left drive mechanism and the right drive mechanism further comprises a plurality of friction disks normally irrotatably coupled to each other and carried along the third axis, the plurality of friction disks hindering relative rotation of the pulley member, first arm and second arm relative to each other.

14. The vehicle of claim 13, wherein each of the left drive mechanism and the right drive mechanism further comprises:

a splined shaft member extending along the third axis and carrying the plurality of friction disks, the pulley, the first arm and the second arm; and a spring maintaining compressive engagement between the plurality of friction disks, the pulley, the first arm and the second arm.

15. The vehicle of claim 14, wherein each of the left drive mechanism and the right drive mechanism includes first, second, third and fourth friction disks in the plurality of friction disks, the first friction disk being located inboard of the pulley, the second friction disk being located between the pulley and the first arm, the third friction disk being located between the first arm and the second arm, and the fourth disk being located outboard of the second arm.

* * * * *